Dec. 28, 1965 S. W. YODER 3,225,945
LOAD SUPPORTING AND DIRECTING DEVICE
Filed June 8, 1962 2 Sheets-Sheet 1
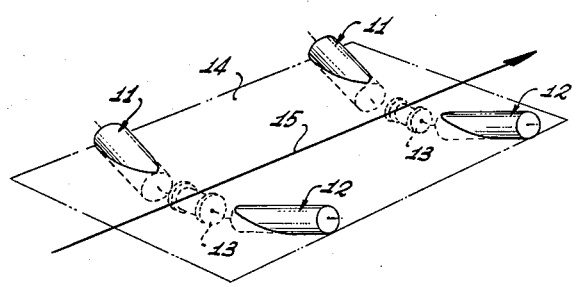
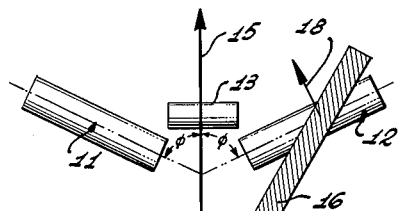
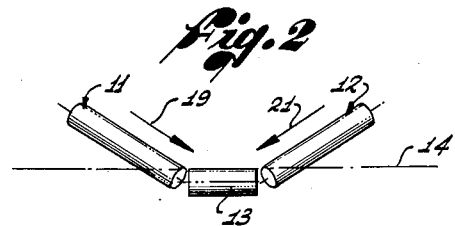
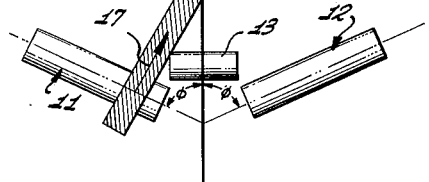
INVENTOR.
STANLEY W. YODER
BY
ATTORNEYS

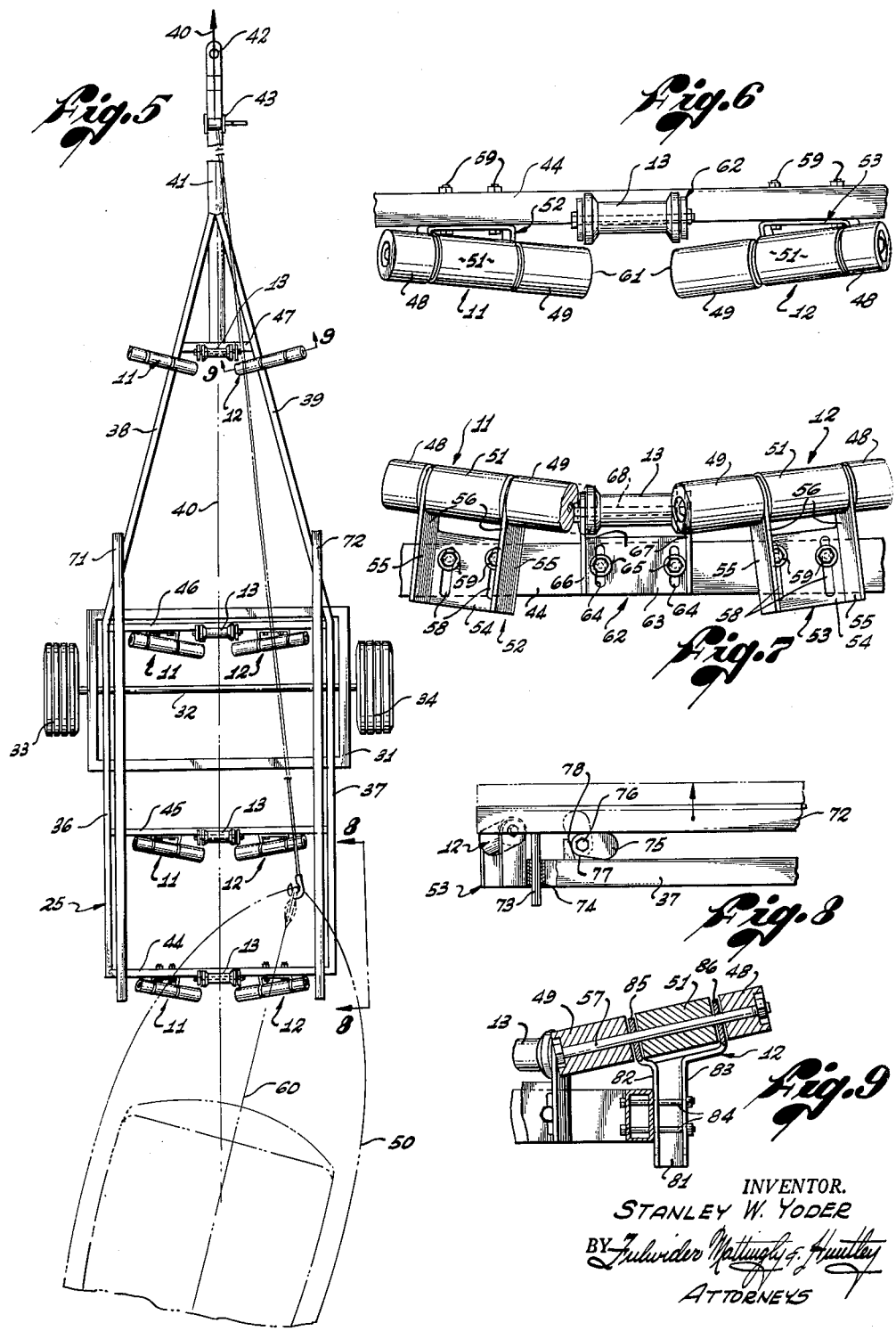

United States Patent Office 3,225,945
Patented Dec. 28, 1965

3,225,945
LOAD SUPPORTING AND DIRECTING DEVICE
Stanley W. Yoder, P.O. Box 67, Little Rock, Ark.
Filed June 8, 1962, Ser. No. 201,044
1 Claim. (Cl. 214—84)

The present invention relates generally to load supporting and directing devices, and more particularly to roller assemblies arranged to support a load for movement therealong and to automatically direct the axis of the load into alignment with the path of movement thereof.

In the passage of a load element over a conveyor made up of a series of roller assemblies the load is often placed upon the rollers in skewed relation, or may assume such a skewed position in its passage over the rollers. This can lead to undesirable complications of transit and delivery, and it is a primary object of the present invention to provide roller conveyor assemblies which will automatically correct any initial skew which may be given to a load placed upon the assemblies so as to align the axis of the load with the axis of the conveyor and which will also automatically correct any tendency of the load to deviate from such axial relationship.

Another object of the present invention is the provision of an improved load supporting and directing device including a plurality of roller assemblies aligned to form a conveyor, with rollers in each assembly at opposite sides of the conveyor axis skewed in opposite directions by having their adjacent ends displaced opposite to the direction of load movement so as to apply a component of force to a skewed load on the roller assemblies to effect movement thereof to align its axis with the conveyor axis.

A further object of this invention is the provision of an improved load supporting and directing device including a plurality of roller assemblies aligned to form a conveyor, with rollers in each assembly at opposite sides of the conveyor axis skewed in opposite directions by having their adjacent ends displaced opposite to the direction of load movement, and with the skewed rollers also canted out of the horizontal plane so that their outside ends are raised above their adjacent ends, the skewing and canting of the rollers serving to move the axis of a load on the assemblies into alignment with the axis of the conveyor.

A still further object of this invention is to provide a new and improved boat trailer apparatus including the load supporting and directing device according to the present invention.

Yet another object of this invention is the provision of an improved boat trailer construction including means for automatically aligning and centering a boat over the longitudinal axis of the trailer, regardless of the boat approaching the trailer in skewed relation.

These and other objects and features of the invention will be readily apparent to those skilled in the art from the following specification and the appended drawings, in which:

FIGURE 1 is a perspective schematic view of a portion of a load supporting and directing device according to the present invention, showing two roller assemblies thereof;

FIGURE 2 is an elevational schematic view of a roller assembly of FIGURE 1;

FIGURE 3 is a plan schematic view of the roller assemblies of FIGURE 1;

FIGURE 4 is a schematic elevational view showing in phantom various canted operational positions for the rollers;

FIGURE 5 is a plan view of a boat trailer according to the present invention;

FIGURE 6 is a plan view of a roller assembly on the trailer of FIGURE 5;

FIGURE 7 is an elevational view of a roller assembly;

FIGURE 8 is a detail view from the line 8—8 of FIGURE 5 showing the side bar raising mechanism on the trailer; and FIGURE 9 is a detail sectional view on the line 9—9 of FIGURE 5.

While the present invention is of general application in load supporting and directing devices and is so illustrated in the schematic representations of FIGURES 1–3, a particular adaptation is in the boat trailer arrangement of FIGURES 4 through 9, wherein the load supporting and directing device is incorporated into a boat trailer so as to automatically move a skewed boat to align and center its axis over the longitudinal axis of the trailer. Accordingly, while the specific exemplification of FIGURES 4 through 9 will be described in detail, it will be understood that the invention is not limited thereto but has general application in the supporting and directing of loads, as will be explained in connection with the schematic showings of FIGURES 1–3, and the invention is not to be limited except as required by the terms of the claims hereof and the prior art.

In the conveyor of FIGURE 1, two only of a series of assemblies of rollers which make up the load supporting and directing device of the present invention are shown, schematically and in perspective, in their relation to a horizontal plane. The illustrated assemblies each include left-hand rollers 11, right-hand rollers 12, and central rollers 13. A horizontal plane through the upper edges of the adjacent ends of the rollers 11 and 12 is indicated at 14, the plane 14 representing the lowest plane below which the roller contacting edges of the load on the conveyor device should not go.

The rollers 11 and 12 are oppositely tilted with respect to the horizontal plane 14, and this position may be referred to as being canted with respect to the horizontal plane. In this canting it will be seen that the remote edges of the rollers 11 and 12 are raised above the level of the adjacent ends thereof. The rollers 11 and 12 are also tilted with respect to a vertical plane at right angles to the axis of the conveyor which is coincident with an arrow 15 representing the path and direction of longitudinal movement of the load through the device. This tilting of the rollers 11 and 12 from a common vertical plane may be referred to as being skewed with respect to the vertical plane; so that the double tilting of the rollers 11 and 12 may be referred to as being canted and skewed with respect to horizontal and vertical planes, respectively. It will be noted that the skewing of the rollers 11 and 12 is in opposite directions, with the adjacent ends of the rollers extending upstream of the path of movement of the load over the conveyor.

The central rollers 13 of the roller assemblies illustrated in FIGURES 1 through 3 are not essential in the broader concepts of the present invention, as the load, if it is of sufficient width, may be supported solely by the rollers 11 and 12 and will not then need the support of the central rollers. Where used, the rollers 13 are preferably disposed horizontally and at right angles to the axis of the conveyor and with their tops preferably in or slightly below the limiting plane 14.

The passage of a load through the supporting and directing device according to the present invention will be explained in connection wtih FIGURES 2 and 3. FIGURE 3 illustrates the directing forces exerted on a load by the skewing of the rollers 11 and 12 from a common vertical plane, while FIGURE 2 illustrates the directing forces on the load resulting from the rollers being canted with respect to the horizontal plane.

Referring first to FIGURE 3, it will be assumed that a load 16 has been placed on the conveyor device in the position shown and is moving in the direction of the arrow 17. Since the direction 17 is substantially transverse to the axis of rotation of the roller 11, there will be substantially no sidewise force on the rear end of the load 16 resulting from the skewing of the roller. However, the front end of the load 16 crosses the axis of rotation of the roller 12 at a small acute angle, and the skewing of this roller exerts a force on the forward end of the load 16 in the direction of the arrow 18, which has a large transverse component and tends to rotate the forward end of the load toward the axis of the conveyor and the arrow 15. Thus, movement of the load 16 through the roller assemblies of the conveyor device will, from the skewing alone of the rollers, tend to direct the load so that its axis coincides with the axis of the conveyor.

Now referring to FIGURE 2, the canting of the rollers 11 and 12 from the horizontal plane will produce components of force on a skewed load in the directions of the arrows 19 and 21, and thus direct the opposite ends of such a load toward the longitudinal axis of the conveyor to align the axis of the load piece therewith.

It will therefore be seen that the combined skewing and canting of the rollers of the device exert directing forces on a load skewed with respect to the axis of the device, acting in the same directions to effect alignment of the load axis with the axis of the device and axial movement of the load over the conveyor.

FIGURES 4 through 9 show the new and improved boat hauling trailer according to the present invention including the device for aligning the keel of the boat with the longitudinal axis of the trailer. The boat trailer, as shown in FIGURE 5, comprises a rectangular subframe 31 mounted upon an axle 32 which is supported at its opposite ends by pneumatic tired wheels 33 and 34. Above the subframe 31 is mounted a frame 35 supporting the roller assemblies of the keel aligning device and including a pair of longitudinally extending leg portions 36 and 37 integrally connected to converging forward leg portions 38 and 39 which are joined together and to a trailer tongue 41 at the longitudinal axis 40 of the trailer. The trailer tongue 41 terminates in a trailer hitch 42 and carries a tow-line winch 43. The leg portions 36 and 37 are interconnected by transverse struts 44, 45 and 46, on each of which is mounted a roller assembly. The forward leg portions 38 and 39 are interconnected adjacent their joined ends by a cross strut 47 which, with the adjacent parts of the leg portions 38 and 39, supports another roller assembly.

Referring to FIGURES 5–7, it will be seen that the rollers 11 and 12 are each made up of three cylindrical segments, including end segments 48 and 49 and a central segment 51. The rollers 11 and 12 are mounted on the cross struts, such as the cross strut 44 in FIGURES 6 and 7, by means of left- and right-hand brackets 52 and 53, respectively, each of which has a central web 54 and side flanges 55. The side flanges 55 are extended upwardly to form ears 56 which are disposed between the central roller segment 51 and the outer roller segments 48 and 49 to support the same. A through-bolt 57 extends through the three roller segments and the ears 56 to support the roller segments upon the brackets 52 and 53, and provides for rotation of the roller segments independently of each other. The webs 54 of the brackets 52 and 53 are provided with spaced, generally vertical slots 58, by means of which the brackets are adjustably and tiltably mounted upon the cross struts 44–46 by means of bolts 59.

It will be seen from FIGURES 5 and 6 that the side flanges 55, including the ears 56, on the brackets 52, 53 have the adjacent flanges wider than the remote flanges, so as to give the rollers a skew with respect to the vertical plane corresponding to that shown in FIGURES 1 and 3. As explained above, this skew is such that the adjacent ends 61 of the rollers 11, 12 are displaced upstream of the path of movement of the boat in a loading direction.

The brackets 52, 53 may be rotated to apply any desired cant to the rollers relative to the horizontal plane by suitably adjusting the position of the slots 58 in the webs 54 of the brackets relative to the bolts 59. Ordinary adjustments can be secured with the slots 58 straight by providing sufficient clearance with respect to the bolts. If it is desired to give a very large cant to the rollers, such as will be explained in connection with FIGURE 4, one or both of the slots 58 in each bracket may be made arcuate to accommodate the greater rotational movement of the brackets.

The rollers 13 are mounted on brackets 62, having webs 63 and slots 64 therein by which the brackets 62 are adjustably connected to the cross struts 44–47 by means of bolts 65. The brackets 62 have side flanges 66 with ear extensions 67 within which the rollers 13 are pivotally mounted by means of through-bolts 68. The slots 64 and bolts 65 permit the positions of the rollers 13 to be adjusted vertically, and since these rollers lie in the longitudinally axis of the trailer there is ordinarily no point in giving them either skew or cant.

To aid in preventing rolling of a boat supported on the trailer, there are provided opposite side bars 71 and 72 adapted to be in a lowered, inoperative position while the boat is unloaded and loaded, and to be raised into a boat-retaining position after the boat is properly located on the trailer. As shown in FIGURE 8, which structure is duplicated at front and back on both sides of the trailer, the side bar 72 is shown mounted on the leg portion 37 of the frame 35 by means of a sliding pin 73 mounted to reciprocate in a guide bearing 74 in the leg portion 37. A lifting cam 75 engageable with the under surface of the side bar 72 is rigidly mounted on a bolt 76 pivoted in a supporting post 77 mounted on the leg portion 37. A stop 78 for the cam 75 is also mounted on the leg portion 37. To raise the side bars 71 and 72, removable cranks (not shown) are engaged with the bolts 76 to rotate the cams 75 until they engage the stops 78, as in the dotted line position of FIGURE 8. This raises the side bars into the dotted line position of FIGURE 8, and serves to retain a boat on the trailer against rolling movement relative thereto. In unloading the boat from the trailer, the cams 75 are rotated back to lower the side bars 71, 72 so that they no longer interfere with boat movement.

FIGURE 9 shows the manner of mounting the rollers 11 and 12 on the forward leg portions 38, 39 of the frame 35. In this arrangement, a bracket 81 having side flanges 82 and 83 is mounted directly on the leg portions 38 and 39 by means of bolts 84 passing through the flanges and through the leg portions. The flanges 82 and 83 are provided with offset portions at their upper ends and terminate in ears 85 and 86, respectively, disposed between the central roller segment 51 and the end roller segments 48 and 49. The segments are mounted on the brackets as before by means of a through bolt 57 passing through the roller segments and through the bracket ears.

FIGURE 4 is a schematic representation of a load supporting and directing roller assembly according to the present invention applied to a boat 50 having a longitudinal axis 60, and showing arrangements of the rollers 11 and 12 with different cants. Thus, in full lines in FIGURE 4, the rollers 11 and 12 are given no vertical cant, but are disposed in the horizontal plane. The boat 50 is shown as having its keel 88 resting on the rollers 13. The side bars 71, 72 are shown in a lowered position so that they will not interfere with the loading of the boat upon the conveyor provided by the load supporting and directing device. Another position for the rollers 11 and 12 to provide them with a small vertical cant is indicated at the phantom position 91 for the roller 11. Again, the rollers may be given a greater vertical cant into the phantom position of 92 wherein they are parallel to, and fully engaged with the bottom surfaces 93 of the boat 50, this again being shown for roller 11 only.

An even greater cant can be given to the supporting and directing rollers 11 and 12 as is shown in phantom position 94 for the roller 12, where smaller or narrower objects than the boat 50 shown are to be supported on the conveyor device. The exaggerated cant of the position 94 can also be utilized in the forward pair of rollers 11, 12 so that they will engage the hull of the advancing boat, and limit its forward position. The upward positions of the side bars 71 and 72 engaging the bottom 93 of the boat are shown in phantom at 95 in FIGURE 4. It will be understood that the lower positions of the side bars will always be such as to place them out of interfering relation to whatever cant position is given to the rollers 11, 12.

While certain preferred embodiments of my invention have been specifically illustrated and described herein, it will be understood that the invention is not limited thereto, as many variations and adaptations will be apparent to those skilled in the art, and the invention is to be given its broadest interpretation within the terms of the following claim.

I claim:

Boat transporting means comprising: a movable carriage having a boat supporting frame thereon; a series of like roller assemblies mounted on said frame and spaced along the longitudinal axis thereof to define a transporting conveyor for a boat, each of said roller assemblies including a pair of like, normally fixed rollers each disposed equidistantly on opposite sides of the longitudinal axis of the supporting frame and skewed in opposite directions from the vertical so that their adjacent ends are offset upstream of the direction of loading of a boat upon the conveyor roller assemblies and frame, said skewed rollers also being canted upwardly and outwardly out of the horizontal, said skewed and canted rollers coacting to automatically direct the axis of a boat being loaded upon said supporting frame into alignment with the longitudinal axis thereof as said boat being loaded passes from one of said roller assemblies to the next of said roller assemblies, each of said roller assemblies further including a central roller disposed with its axis of rotation substantially horizontal and transverse to the longitudinal axis of said frame and with the upper surface of each central roller being not substantially above the lowest edges of the upper surfaces of the skewed and canted rollers of its assembly; and side bars extending along the longitudinal axis of said frame at opposite sides thereof, said side bars being adjustable vertically from a lowered, noninterfering position to an upper, boat holding position.

References Cited by the Examiner
UNITED STATES PATENTS

| | | | |
|---|---|---|---|
| 1,446,270 | 2/1923 | Pfeiffer | 198—192 |
| 2,860,792 | 11/1958 | Nelson | 214—84 |
| 2,901,138 | 8/1959 | Whalen | 214—506 |
| 3,056,517 | 10/1962 | Trumbull | 214—84 |
| 3,077,277 | 2/1963 | Holzman | 214—84 |
| 3,087,601 | 4/1963 | Presti | 198—202 X |

GERALD M. FORLENZA, *Primary Examiner.*

HUGO O. SCHULZ, *Examiner.*